INVENTOR.
RICHARD M. KUTS
JOHN L. REHMAN
BY Oldham & Oldham
ATTYS.

United States Patent Office 3,343,435
Patented Sept. 26, 1967

3,343,435
CIRCUMFERENTIAL PEELING MACHINE WITH SELECTIVE THICKNESS CUTTING ADJUSTMENT
Richard M. Kuts, Cuyahoga Falls, and John L. Rehman, Barberton, Ohio, assignors to The Falls Engineering and Machine Co., Cuyahoga Falls, Ohio, a corporation of Ohio
Filed Jan. 24, 1966, Ser. No. 522,654
9 Claims. (Cl. 82—102)

This invention relates to a circumferential peeling machine, and more particularly to such machine having a selectively adjustable thickness cutting attachment to easily facilitate adjustment of the thickness of material cut off a rotating bun or cylinder of sponge rubber, or other similar base material.

Heretofore, it has been well known that circumferential peeling or paring machines have been used in the foam art, either synthetic or natural, to convert a square, or bulk bun of material into a flat elongated sheet, which may then be used for many different purposes. These prior art machines have adjusted the thickness of the foam being cut by slowly dropping the mandrel rotating the foam at a uniform rate so that the cutting knife, extending longitudinally adjacent the periphery of the roll, peels off a continuous thickness of material. Heretofore, this slow uniform lowering has been achieved by rotating screws which were directly mechanically connected and coordinated with the rotation of the mandrel. Any requirement to vary the thickness of the strip of material peeled off the roll was accomplished by changing the screws thereby controlling the rate of lowering the roll. It is a requirements in this type of peeling machine that the roll turn absolutely without drag of any type so that a uniform cut is achieved. Thus, the mechanical geared interconnection between the mandrel carrying the roll and the screws lowering it must not create a mechanical disadvantage, nor cause drag. Any prior art attempts to control the rotation ratios between the mandrel and the screws have been unsuccessful because of their expense and they have generally interfered with the free wheeling rotation of the mandrel.

Therefore, it is the general object of the present invention to avoid and overcome the foregoing and other difficulties of and objections to prior art practices by the provisions of a circumferential peeling machine which can selectively vary the rotation ratio between the mandrel and the feed screws over a very wide range to thereby selectively vary the thickness of material cut off the rotating roll.

A further object of the invention is to provide a selective thickness cutting adjustment for a circumferential peeling machine wherein the thickness adjustment can be made in increments of one thousandths of a inch, and yet the mandrel carrying the roll will rotate easily, and with negligible drag.

A further object of the invention is to provide a selective thickness cutting adjustment for a circumferential peeling machine which is easy to incorporate into existing equipment, and which is highly reliable, and yet low in cost.

The aforesaid objects of the invention and other objects which will became apparent as the description proceeds are achieved by providing in a circumferential peeling machine the combination of a frame including a pair of spaced parallel vertically extending supports, a slide assembly vertically slidably received on each support, a bun receiving mandrel rotatably journalled at each end by the respective slide assemblies, a separate vertically extending screw rotatably mounted at its top end to the frame and threadably received through each of the slide assemblies whereby similar rotation of the screws uniformly controls the vertical height of the slide assemblies, shaft and gear train means mechanically interlocking the rotation ratio of the mandrel to the rotation of the screws, and speed variator means associated with the shaft and gear train means to selectively vary the rotation ratio of the mandrel to the screws.

For a better understanding of the invention, reference should be had to the accompanying drawings, wherein.

Figure 1:
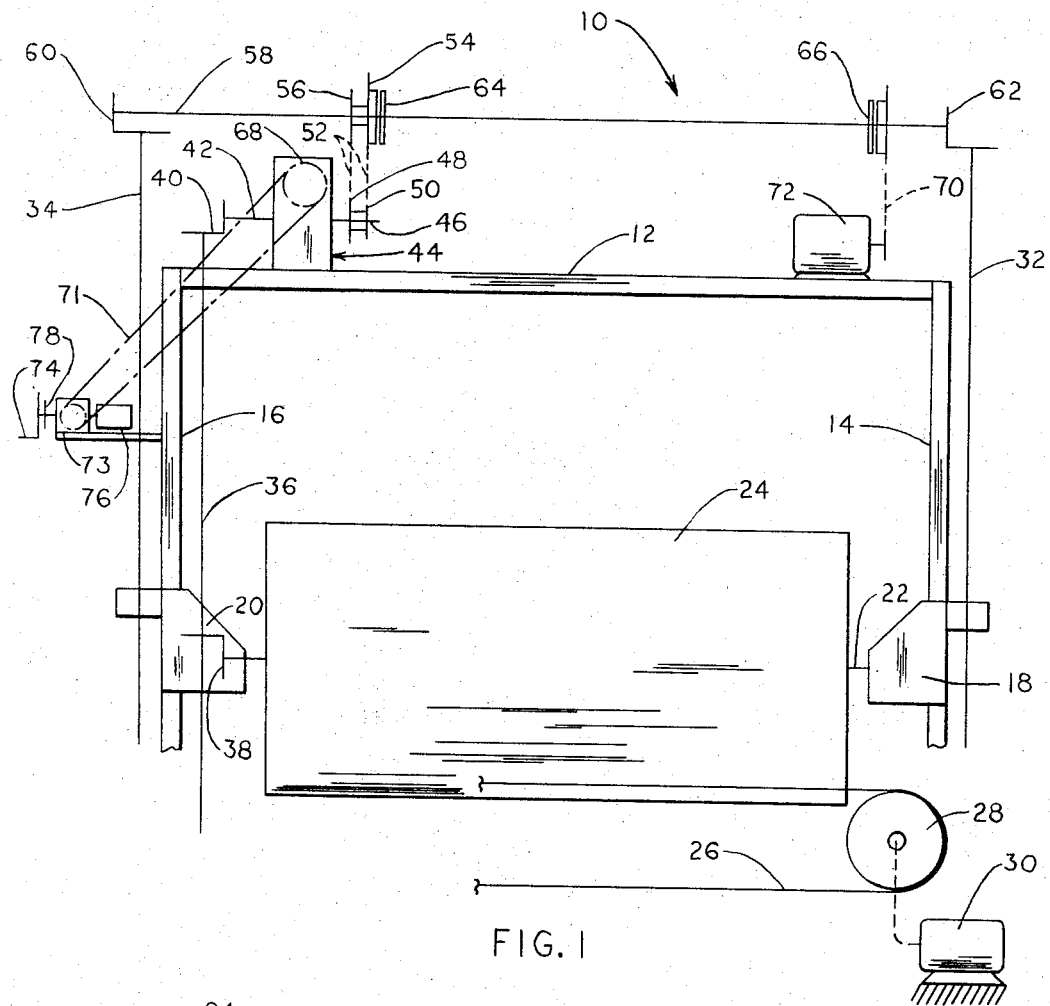
FIGURE 1 is a schematic illustration showing the necessary structural components and their interrelation to variable thickness cutting adjustment.

With reference to the form of the invention illustrated in FIGURE 1 of the drawings, the numeral 10 indicates generally and schematically a circumferential peeling machine which comprises essentially a base frame 12 including a pair of vertically directed side supports 14 and 16 which normally are mounted to a base or floor. In the usual manner with this type of machine, a pair of slide assemblies 18 and 20 are slidably received on the supports 14 and 16, respectively. The supports 18 and 20 rotatably journal a mandrel 22 at each end thereof. In the usual practice of the invention, the mandrel normally will have one spring loaded end so that it may be easily removed and replaced into journalled relationship with the slides 18 and 20. The mandrel 22 is adapted to carry in substantially fixed relation a bun or roll 24, normally made of rubber or plastic foam, from which it is desired to peel or strip a continuous uniform thickness flat layer. Such stripping is accomplished by an endless cutting blade or ribbon 26 carried over by suitable means including a roller 28 and driven by a motor 30, all in the usual manner.

In order that the bun 24 will be slowly lowered while it is rotating to facilitate cutting with the ribbon 26, each of the slides 18 and 20 is driven in vertical relationship by a respective lead screw 32 and 34, respectively. In the usual operation of this type of peeling machine, lead screws 32 and 34 are directly connected through an appropriate shaft and gear arrangement to the mandrel 22 so that rotation of the mandrel 22 automatically causes rotation of the lead screws 32 and 34 and consequential slow lowering of the mandrel 22.

In the specific set-up of the preferred embodiment illustrated in FIGURE 1, the mandrel 22 drives a spline shaft 36 through a pair of one-to-one gears, indicated by the numeral 38. The mandrel 22 is driven by external means, as described hereinafter. The spline shaft 36 drives another one-to-one gear set 40, with an output shaft 42 then driving into a speed variator, indicated generally by the numeral 44. The variator 44 drives an output shaft 46 which mounts two drums 48 and 50 fixed together but each having different diameters, as illustrated. These drums 48 and 50 operate through a belt drive indicated by dotted lines 52 for association with either a drum 54 or 56 mounted to a screw connecting shaft 58. This belt drive operates in the usual manner well known in the art to provide two entirely different speed ratio depending upon which drum combinations are utilized with the same length endless belt. The screw connecting shaft 58 operates at each end through two-to-one gear set 60 and 62 to thereby mechanically interconnect with screws 32 and 34, respectively. The shaft 58 is a continuous member so that the drive over the belts 52 from the variator 44 is accomplished by the use of a suitable clutch 64, either electrical or mechanical, as selectively desired.

In the normal operating mode of the peeling machine, the clutch 64 will be energized and driving movement of the roll 24 is accomplished by simply grasping the piece which is being peeled off and pulling on it by associated equipment known to the art, but not shown in the drawings. This driving movement then transfers through the shaft and gear trains already described to effect rotation of the lead screws 32 and 34 and consequent lowering of the mandrel 22 as the material is peeled and cut thereoff by the knife 26. However, when the bun or roll 24 has been almost fully peeled, some means must be provided to move the mandrel 22 back up to its top position for the positioning of a new bun or roll thereon. This is accomplished by releasing the clutch 64 and energizing a suitable clutch 66. The clutch 66 is connected by a suitable drive, indicated by dotted lines 70, to a motor 72. The motor 72 runs in such a direction so as to rotate the lead screws 32 and 34 in a reverse direction so as to raise the slides 18 and 20 thereby effectively raising the mandrel 22 to the desired position.

The variator 44 is adjustable so as to control the mechanical rotation ratio between the mandrel 22 and the lead screws 32 and 34. This adjustment is made simply by rotating a control shaft 68, and for convenience sake, the drive for the shaft 68 may be achieved by a suitable chain 71, connected to a gear reducer 73, which is driven manually by a handle 74. The gear reducer 73 may have connected thereto a counter 76 to indicate the particular rotation ratio between the mandrel 22 and the lead screws 32 and 34 so as to indicate thereby the thickness of material to be peeled off the roll 24. A torque limiter 78 may be provided to insure that the shaft 68 on the variator 44 is not driven in either direction beyond its normal tolerances.

Figure 2A:
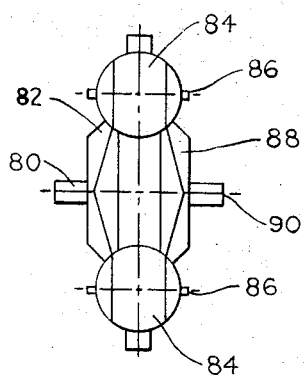
FIGURE 2A is a schematic illustration of the variable controller utilized as part of the combination of FIGURE 1 showing a one-to-one ratio.
Figure 2B:
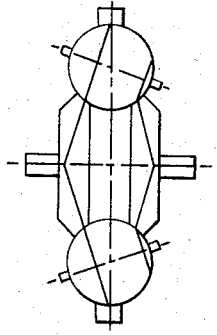
FIGURE 2B is a schematic illustration of the variable control apparatus showing a three-to-one decrease in input to output shaft ratio.
Figure 2C:
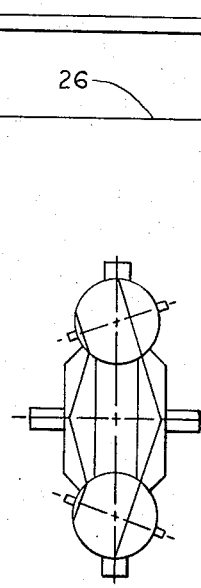
FIGURE 2C is a schematic illustration of the mechanism of FIGURE 1 showing a one-to-three increase in input shaft to output shaft rotation ratio.

The speed variator 44 which accomplishes the controlled rotation ratio variation between the mandrels 22 and the lead screws 32 and 34 must do so without creating any mechanical disadvantage between such members, and particularly must allow the mandrel 22 to rotate freely so that the material peeled thereof will be of high quality and uniform thickness, all as well known in the art of peeling machinery. A suitable mechanism to accomplish this purpose is a speed variator made by the Cleveland Worm and Gear Division of The Eaton Manufacturing Company, 3261 East 80th Street, Cleveland 4, Ohio. The operation of this variator is illustrated in FIGURES 2A through 2C.

Essentially, the mechanism transmits the rotation of an input shaft 80 into a beveled drive disc 82 and then into a plurality of drive balls 84 mounted for rotation about axles 86. Rotation of the beveled drive disc 82 causes the balls to rotate about their axles 86, and cause rotation of an output drive disc 88, which in turn drives an output shaft 90. It can thus be seen that simple adjustment of the rotating axis of the balls 84 by the shaft 68, as seen in FIGURE 1, will thereby vary the rotation rate between the input and output shafts. FIGURE 2A illustrates a one-to-one ratio, while FIGURE 2B illustrates a three-to-one decrease and FIGURE 2C illustrates a one-to-three increase. Note that the driving point on the balls is varied because of the tilting of the axles 86 in these instances. It should be noted, however, that both or all axles are tilted to the same angle and in the same direction. Thus, it should be seen that this mechanism represents a simple, compact variator that produces infinitely variable output speed within certain limits upon a constant input speed. It offers an exceptional economy of space, it produces almost no mechanical disadvantage, and does not provide drag which might cause improper cutting of the roll 24 by the ribbon 26.

The invention contemplates that with a variation from one-to-three to three-to-one giving an overall nine-to-one change possibility, that many ranges of thickness cutting with the material may be accomplished. For example, if each of the lead screws 32 and 34 were of one-fourth inch thread, and the belt drive 52 were connected to drums 50 and 54, respectively, hereinafter called position 1, which is set up to provide a 2.5-to-one decrease, cutting thickness can be varied by adjusting the variator 44 from .016 inch minimum to a .100 inch maximum. A similar set-up with the belt 52 operating between drums 48 and 56, hereinafter called position 2, which provides a 1.5-to-one decrease, would give variations from a .027 inch minimum to a .166 inch maximum. Then, if the lead screws 32 and 34 were changed to a one inch thread configuration, the belt drive 52 in position 1 between the drums 50 and 54, would give a range of from .066 inch minimum to .400 inch maximum. In position 2, the one inch lead screw would give a thickness cutting range of from .110 inch minimum to .666 inch maximum. It is thought that these thickness range variations would cover practically all possible thicknesses of peeling as required in the present state of the art. To this end, the counter 76 would be calibrated for the relative positions and it would simply be a matter of checking a pre-prepared chart to find out for each set-up what the particular reading on the counter would indicate as the thickness of material that would be peeled. In effect then, the counter acts as a micrometer dial, and infinite variations there will be represented by a very small variation in the thickness of material cut. Naturally, it is desirable to cut this material to very fine tolerances so that production costs, material costs, and final product costs can be substantially reduced.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a circumferential peeling machine, the combination of
   a frame including a pair of spaced parallel vertically extending supports,
   a slide assembly vertically slidably received on each support,
   a bun receiving mandrel rotatably journalled at each end by the respective slide assemblies,
   a separate vertically extending screw for each slide assembly rotatably mounted at its top end to the frame and threadably received through one of the slide assemblies whereby similar rotation of the screws uniformly controls the vertical height of the slide assemblies,
   shaft and gear train means mechanically interlocking the rotation ratio of the mandrel to the rotation of the screws, and
   speed variator means associated with the shaft and gear train means to selectively vary the rotation ratio of the mandrel to the screws.

2. A machine according to claim 1 where both the screws have one particular thread pitch ratio, but are readily interchangeable to screws having another thread pitch ratio.

3. A machine according to claim 1 which includes means to controllably clutch the mechanical interlock between the mandrel and the screws, and motor means to rotate the screws in the clutched position to drive the slide assemblies toward the top of the supports without rotation of the mandrel.

4. A machine according to claim 1 where the shaft and gear train means include a belt drive which is operable at any of a plurality of positions all of which vary the interlocked rotation ratio of the mandrel relative to the screws.

5. A machine according to claim 1 where the mandrel normally rotates faster than the screws, but where the speed variator means can control the rotation ratio to the extent that the mandrel rotates slower than the screws.

6. A machine according to claim 1 where the rotation of the mandrel is free and easy and where such rotation backs through the shaft and gear train means to effect rotation of the lead screws with very little resistance.

7. A machine according to claim 1 where the speed variator means comprises an input shaft, a drive ring driven by the input shaft, an output drive ring, a plurality of balls in simultaneous complementary engagement with the circumference of both drive rings, said balls rotatable about defined axes, means to selectively control the rotation axis of the balls, but with the rotation axis of all the balls always being similar, and an output shaft driven by the output drive ring.

8. A machine according to claim 7 where the means to selectively control the rotation axis of the balls is connected to a micrometer dial indicator whereby the actual rotation ratio between the mandrel and the lead screws can be readily ascertained.

9. In a circumferential peeling machine having a frame including a pair of spaced vertically extending supports, a slide assembly slidably received on each support, a bun receiving mandrel rotatably journalled at each end by the respective slide assemblies, a separate screw vertically extending, rotatably mounted by the frame and threadably received through each respective slide assembly, shaft and gear train means mechanically interlocking the rotation ratio of the mandrel to the rotation of the screws which is characterized by mechanical speed variator means included as a combined part of the shaft and gear train means which is selectively adjustable to vary the mechanically interlocked rotation ratio of the mandrel to the screws, and wherein a bun of material is carried on the mandrel, with rotation of the mandrel being achieved by grasping and pulling on the material as it is cut and peeled from the bun.

References Cited

UNITED STATES PATENTS 3,250,161    5/1966    Guilford _____ 82—101

FOREIGN PATENTS 678,658    1/1964    Canada.

HARRISON L. HINSON, *Primary Examiner.*